Nov. 17, 1959  J. W. TWEEDY  2,912,869
DRIVING SYSTEM FOR A WINDSHIELD WIPER OR THE LIKE
Filed June 14, 1956  2 Sheets-Sheet 1

INVENTOR.
JAMES W. TWEEDY
BY *James and Franklin*
ATTORNEY

Nov. 17, 1959    J. W. TWEEDY    2,912,869
DRIVING SYSTEM FOR A WINDSHIELD WIPER OR THE LIKE
Filed June 14, 1956

INVENTOR.
JAMES W. TWEEDY
BY James and Franklin
ATTORNEY

United States Patent Office 2,912,869
Patented Nov. 17, 1959

2,912,869

DRIVING SYSTEM FOR A WINDSHIELD WIPER OR THE LIKE

James W. Tweedy, Owosso, Mich., assignor, by mesne assignments, to Controls Company of America, Schiller Park, Ill., a corporation of Delaware Application June 14, 1956, Serial No. 591,351

4 Claims. (Cl. 74—70)

The present invention relates generally to a system for converting continuous rotary motion into oscillatory motion of a shaft or the like, and more particularly to a system by means of which windshield wiper blades may be driven in oscillation by means of a continuously rotating power source such as an electric motor and may be parked in an out-of-the-way position beyond their normal range of oscillation.

Electric motor drive for windshield wipers is very advantageous because of the relative ease with which the speed of oscillation of the wiper blades may be controlled and particularly because that speed of operation is independent of the transient operating conduitions to which the vehicle may be subjected. With more conventional types of windshield wiper power, for example, the wiper blades will slow down or even come to a stop when the car is accelerating or when the car is laboring, as when going up a hill, yet it may be exactly at those times that greatest visibility is desired.

However, because a driving electric motor rotates continuously in a given direction, whereas the windshield wiper blades must be oscillated, some type of linkage must be interposed between the motor shaft and the wiper blades in order to convert rotary movement into oscillatory movement. These linkages have taken many forms, and have in general been characterized by complexity and consequent expense, by being excessively subject to wear or breakage, or both.

In addition, for purposes of esthetics as well as safety, it is desirable that windshield wiper blades, when not in use, be parked at a position well outside their normal range of movement, and preferably substantially against the edge of the windshield. When in this position they are visually unobstrusive and do not in any way obstruct the vision of the driver or the other occupants of the car. If the blades were to be oscillated in such a manner as to attain this parked position during operation, they would slap against the edge of the windshield during each cycle, and thus their operation would be accompanied by an excessive amount of noise.

The present invention relates to a simple, sturdy, positively acting and substantially foolproof linkage which may very readily be manufactured and assembled and which will effectively convert the rotary motion of the motor shaft into oscillatory motion of a shaft or other transmission element which is in turn operatively connected to the windshield wiper blades. The arrangement is such as to permit control of the area over which the blades wipe, and to automatically cause de-energization of the driving motor when the blades reach their parked position. A single control element is effective to start the motor and cause the windshield wiper blades to oscillate over the desired operating area and to stop the motor and cause the blades to come to rest in a parked position beyond their normal range of oscillation.

This is accomplished, in the form here specifically disclosed, by connecting a shaft operatively secured to the wiper blades with a continuously rotating member driven by an electric motor or the like. The connection includes a connecting part secured to and extending from the shaft for oscillation therewith and also independently pivotal with respect to that shaft about an axis angularly related to the axis of rotation of the shaft. This connecting part is operatively secured to the continuously rotating member at a point displaced from the axis of rotation of the latter by means of a universal joint, here shown as of the ball and socket type. Rotation of the member will therefore cause the shaft, and consequently the windshield wiper blades connected thereto, to oscillate.

The position of the continuously rotated member relative to the shaft, as considered in a direction substantially at right angles to the axis of rotation of the shaft, will determine the particular arc over which the shaft will oscillate, and hence will determine the arc over which the windshield wiper blades will sweep. Hence shifting of the continuously rotated member relative to the shaft in the aforementioned direction will be effective to vary the area over which the blades will wipe, and hence will be effective to differentiate between the operating and parking positions of the blades.

The aforementioned relative position of the continuously rotated member can also be made effective to open or close a switch controlling the energization of the motor, the opening or closing of that switch preferably also being sensitive to the rotative position of the member, and more especially to that rotated position of the member corresponding to an extreme position of the windshield wiper blades. Thus by moving the continuously rotating member to a position in which the switch is adapted to be actuated, and by causing that actuation to take place when the rotated member is in a rotative position corresponding to the parking position of the wiper blades, an effective unitary control of the entire windshield wiper drive system is readily effectuated.

The universal joint between the connecting part extending from the shaft and the continuously rotated member is so designed as to maintain the operative connection between the shaft and member no matter in which position the member may be relative to the shaft. With the ball and socket joint here specifically disclosed the depth of the socket is made sufficiently greater than the thickness of the ball so that the latter has play within the socket in the direction of the depth thereof sufficient to permit movement of the member between its operative position.

To the accomplishment of the above, and to such other objects as may hereinafter appear, the present invention relates to the driving system as defined in the appended claims and as described in this specification taken together with the accompanying drawings, in which:

The driving system of the present invention is here specifically disclosed for the driving of windshield wiper blades and for the parking of those blades at a position beyond their normal area of oscillation, but it will be understood that in its more general aspects the system is capable of wide application.

Figure 1:
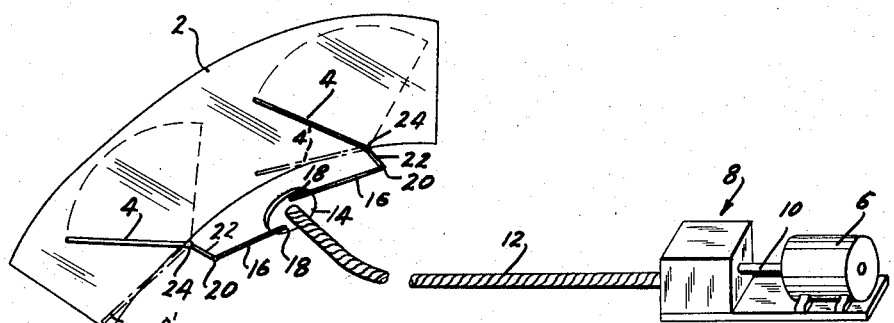
Fig. 1 is a semi-schematic view of the system of the present invention as applied to the driving of windshield wiper blades.
Figure 2:
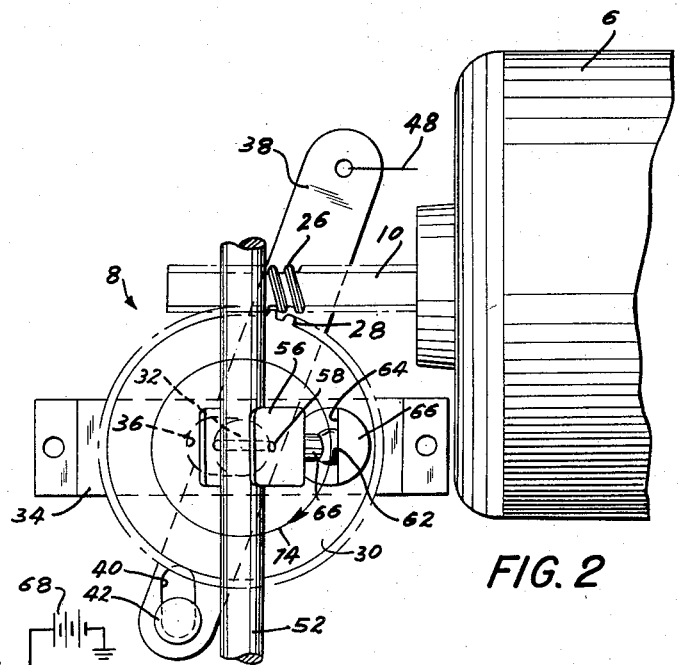
Fig. 2 is a top plan view of one embodiment of the linkage mechanism employed, shown in a position corresponding to normal operation of the blades.

Referring first to Fig. 1, there is disclosed a windshield 2 over which wiper blades 4 are adapted to oscillate so as to cover the areas indicated by the broken lines. The blades 4 are, however, adapted to be parked in an out of the way position designated 4' and indicated by dot-dash lines. The blades are adapted to be oscillated by a continuously rotating electric motor 6, that motor being operatively connected to a motion conversion linkage generally designated 8 and the details of which will be hereinafter set forth, the linkage 8 being effective to convert continuous rotary motion of the output shaft 10 of the motor 6 into oscillatory motion of the shaft 12. The shaft 12 may be operatively connected to the windshield wipers 4 in any appropriate manner in order to transmit its oscillation to the blades 4. As here disclosed purely for purposes of exemplification, the shaft 12 oscillates a disk 14 to which links 16 are pivotally secured at 18, the other ends of the links 16 being pivotally secured at 20 to arms 22 constituting an extension of the blades 4, the blades 4 and arms 22 as a unit pivoting about points 24.

For details of the motion converting linkage generally designated 8, reference will be made to Figs. 2–6. The motor shaft 6 has a worm 26 formed thereon, and that worm meshes with gear teeth 28 on a member 30 mounted for rotation on a pin 32. The member 30 is mounted on a bracket 34 having an elongated slot 36 extending in the direction parallel to the form 26 and through which the pin 32 passes and is slidable. The lower end of the pin 32 is pivotally secured to a control lever 38 which extends under the bracket 34 and which is provided at one end with an elongated slot 40 within which pin 42 is received, that pin extending up from boss 44 on the supporting structure 46 upon which the bracket 34 is also mounted. The other end of the control lever 38 is connected, by means of control cable 48 or any other suitable linkage, to a manual control located, for example, on the dashboard of the vehicle.

The shaft 12, which may be of the flexible type, and is so here illustrated, may be connected in any appropriate manner, generally designated 50 (see Fig. 4) to a second shaft 52 for oscillation therewith, the shaft 52 being journaled in standards 54 so as to extend above the member 30. A U-shaped bracket 56 is secured to the shaft 52 by pin 58 which passes through the shaft 52 in a direction substantially at right angles to the axis of rotation therewith, and the bracket 56 is pivotal with respect to the shaft 52 about the axis of the pin 58. Extending from the bracket 56 is a rod 60 having a ball 62 at the end thereof. This ball is received within a socket 64 formed in a part 66 extending up from the member 28 at a point displaced from the axis of rotation of the member 28. The ball and socket joint 62, 64 constitutes a universal connection between the part 56, 60 and the part 66, and these two parts connect the shaft 52 and the member 28. As may be seen from an examination and comparison of Figs. 3 and 6, the socket 64 is of appreciable depth, thus providing for appreciable movement of the ball 62 therein in the direction of that depth without disruption of the operative connection which the joint 62, 64 constitutes.

Figure 3:
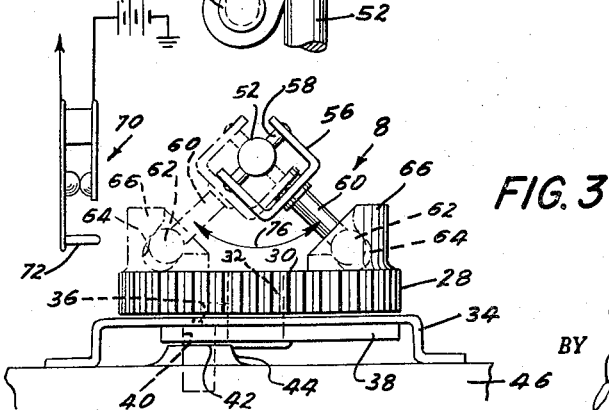
Fig. 3 is an end elevational view taken from the lower end of Fig. 2.
Figure 4:
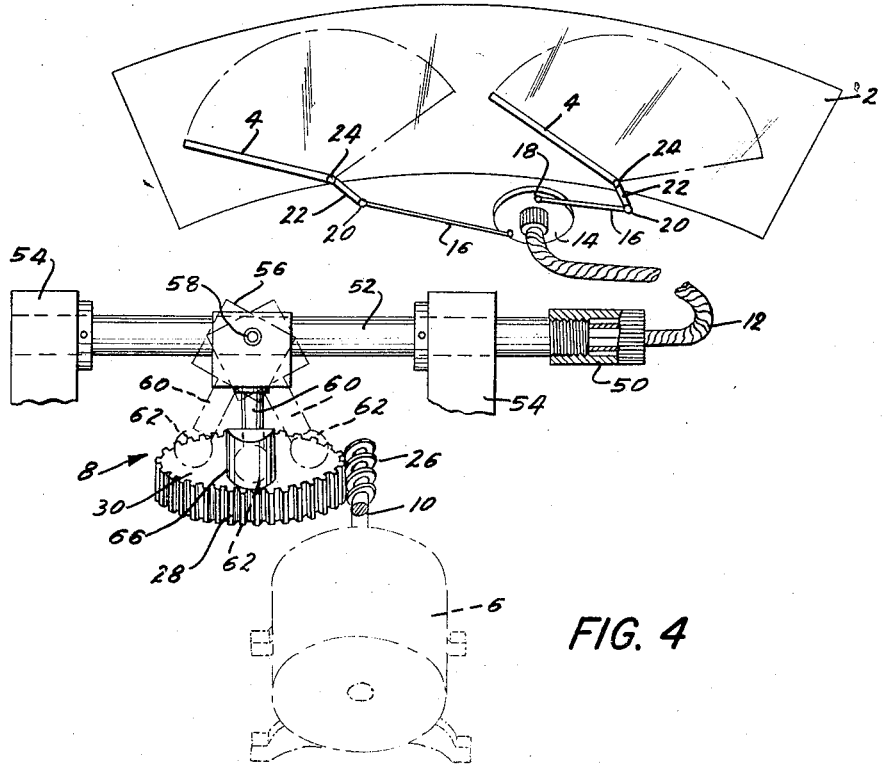
Fig. 4 is a three-quarter perspective view of the linkage of Figs. 2 and 3 showing one manner in which the shaft may be connected to the windshield wiper blades.
Figure 6:
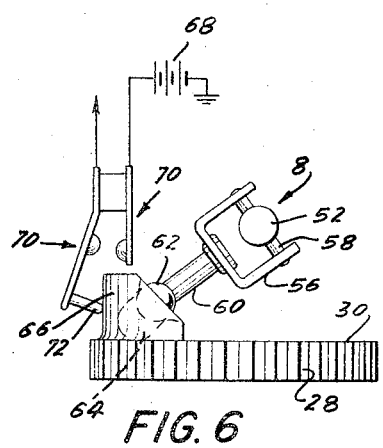
Fig. 6 is a schematic end elevational view taken from the lower end of Fig. 5.

As schematically shown in Figs. 3 and 6, the motor 6 is connected to a battery 68 by a normally closed switch generally designated 70, that switch being mounted in any appropriate manner adjacent to the member 28 and in line with the part 66 extending up therefrom, the switch 70 having a part 72 which may be located as illustrated in Figs. 3 and 6.

The operation of the system of the present invention is as follows. When the windshield wiper blades are to be used the manual control on the dash board or elsewhere is actuated so as to move the control lever 38 to its position shown in Figs. 2 and 3. This will slide the member 30 over the bracket 34 to its position as illustrated. The motor 6 will be energized and the shaft 10, the worm 26 and the member 30 will all be continuously rotated, the latter, for example, in the direction of the arrow 74 of Fig. 2. As the member 30 rotates the rod 60 will be moved by virtue of the ball and socket connection 62, 64. Its movement up and down as viewed in Fig. 2 (into and out of the paper as viewed in Fig. 3) will be operatively ineffective, the rod 60 and bracket 56 merely pivoting about the pin 58. However, that component of its movement from side to side as viewed in Figs. 2 and 3 (see the arrow 76 in Fig. 3) will be transmitted via the bracket 56 and the pin 58 to the shaft 52, and that shaft will therefore oscillate, the degree of oscillation of the shaft being indicated by the solid and broken line positions of the parts 66, 60, 56 in Fig. 3. This oscillation of the shaft 52 will be transmitted via shaft 12 and the linkage associated therewith to the wiper blades 4, and they will therefore sweep back and forth over the windshield areas shown in broken lines in Fig. 1. During this operation the part 66 will not engage the part 72, since the latter is disposed out of the range of travel of the former. Consequently the motor 6 will remain energized.

Figure 5:
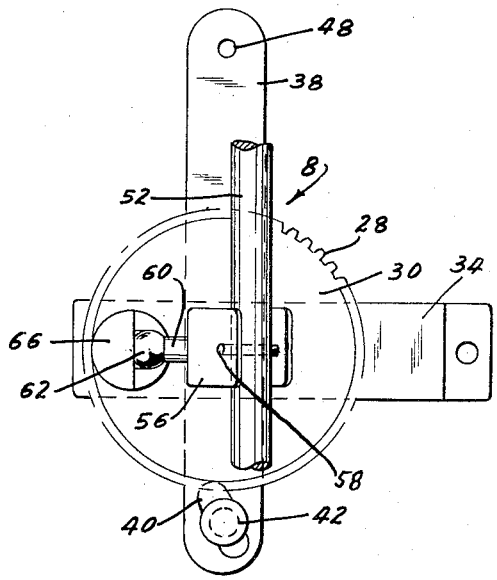
Fig. 5 is a partial top plan view of the linkage of Fig. 2 but in the position which it may assume for parking of the windshield wiper blades.

When it is desired to park the wiper blades the manual control is actuated so as to pivot the control lever 38 to its position shown in Fig. 5. This will move the pin 32 and the member 30 to the left as viewed in Figs. 2 and 3. Formerly, as here specifically illustrated, the vertical axis of rotation of the member 30 intersected the horizontal axis of rotation of the shaft 52. While this is not an essential relationship, it is a desirable relationship during normal operation of the linkage because, as the member 30 rotates, the socket 64 will always be equally spaced from the pin 58, and hence the ball 62 will rotate therein but will not move appreciably in the direction of the depth of the socket 64. In the new position of the member 30, as illustrated in Figs. 5 and 6, the vertical axis of rotation of the member 30 will lie to the left of the horizontal axis of the shaft 52. The immediate effect of this shift in position as between the member 30 and the shaft 52 will be to shift the arc over which the shaft 52 oscillates, the degree of shift being determined by the distance to which the member 30 is displaced. The distance and direction of this shift is such as to cause the blades 4, at one extreme of movement, to assume the position 4' suitable for parking. The parts of the linkage are shown in Figs. 5 and 6 in that "parking" position. It will be noted that because of the worm and gear linkage 26, 28 the physical shift of the member 30 can be accomplished without destroying the operative connection between itself and the motor 6, the worm 26 being made sufficiently long to accomplish this.

When the member 30 has been shifted to its "parking" position the path of travel of the part 66 as the member 30 rotates is also shifted so as to intersect the part 72 on the switch 70. Hence as the member 30 rotates the part 66 carried thereby will engage the switch part 70 when the rotative position of the member 30 corresponds to the "parking" position of the shaft 52 and wiper blades 4, thus opening the circuit to the motor 6 and causing that motor to stop.

It will be observed that with this arrangement parking is effectuated in an extremely efficient manner, and always within at least one cycle of oscillation of the wiper blades 4. Indeed, if the shift of the member is effectuated while the blades 4 happen to be moving toward their parked position, parking will be almost instantaneous. It will further be noted that the mere shift of the mechanical element 30 to "parking" position is all that must be manually accomplished, the electrical de-energization of the motor 6 at the appropriate time following automatically, and that the mere shift of the mechanical element 30 to "operating" position is effective to cause the motor 6 to start to rotate, since such movement of the member 30 causes disengagement between the parts 66 and 72, the switch 70 then closing.

When the member 30 is in its "parking" position shown in Figs. 5 and 6 the distance between the shaft 52 and the socket 64 on the member 30 will vary in accordance with the rotative position of the member. Hence the ball and socket connection 62, 64 is designed to permit sufficient play in the direction of the depth of the socket 64 to accommodate for this variation without destroying the operative connection between the member 30 and the shaft 52. Rotation of the member 30 when in the position shown in Figs. 5 and 6 will, of course, be accomplished by some translation of the ball 62 within the socket 64 in the direction of the depth thereof, but this movement will not continue for any length of time, since the blades are always parked and automatically stopped within a single cycle of operation, and consequently this does not represent any appreciable source of wear.

The linkage by means of which these extreme effective results are obtained is sturdy, composed of but a very limited number of parts, requires no particular skill or trouble in assembly, and need not be made to any special degree of precision or accuracy. The linkage may well be expected to outlast the life of the vehicle without requiring adjustment or maintenance.

While but a single embodiment of the present invention has been here disclosed, it will be apparent that many variations may be made therein, all within the spirit of the invention as defined in the following claims.

I claim:

1. In a driving system for an oscillated element adapted to be driven in oscillation by a continuously rotating driving element; the improvement which comprises a member operatively connected to said driving element so as to be rotated thereby about a first axis, a shaft operatively connected to said oscillated element and supported adjacent said member for oscillation about a second axis, a first connecting part secured to and extending from said shaft for oscillation therewith about said second axis and being articulate relative thereto substantially about a third axis substantially perpendicular to said second axis, a second connecting part on said member spaced from said first axis, said first and second connecting parts being operatively connected by a universal joint, and shifting means to which said member, including said first axis, is operatively connected, said shifting means, when actuated, shifting said member and first axis in a direction which is perpendicular to said first and second axes, thereby shifting the range of oscillated positions of said shaft as said member rotates.

2. In a driving system for an oscillated element adapted to be driven in oscillation by a continuously rotating driving element; the improvement which comprises a member operatively connected to said driving element so as to be rotated thereby about a first axis, a shaft operatively connected to said oscillated element and supported adjacent said member for oscillation about a second axis, a first connecting part secured to and extending from said shaft for oscillation therewith about said second axis and being articulate relative thereto substantially about a third axis substantially perpendicular to said second axis, a second connecting part on said member spaced from said first axis, said first and second connecting parts being operatively connected by a universal joint defined by a socket on one of said connecting parts and a ball on the other of said connecting parts and received within said socket, said socket having an effective depth greater than that of said ball, whereby said ball has a limited degree of movement within said socket in the direction of the depth thereof without destroying said operative connection said connecting parts, and shifting means to which said member, including said first axis, is operatively connected, said shifting means, when actuated, shifting said member and first axis in a direction which is perpendicular to said first and second axes, thereby shifting the range of oscillated positions of said shaft as said member rotates without appreciably altering the amplitude thereof, said shift being accompanied by movement of said ball in said socket in the direction of the depth of said socket.

3. In the system of claim 1, control means for said driving element including a control part positioned adjacent said rotated member, said second connecting part on said rotated member being moved thereby over a given range of movement dependent in part upon the position of said rotated member, said control part normally being outside the range of movement of said second connecting part, and an operative connection between said means for causing a relative shift in position between rotated member and shaft on the one hand and one of the said control part and second connecting part on the other hand effective to bring said control part into the path of movement of said second connecting part when said relative shift is accomplished so as to cause said control part to be engaged by said second connecting part as the latter is rotated.

4. In the system of claim 2, control means for said driving element including a control part positioned adjacent said rotated member, said second connecting part on said rotated member being moved thereby over a given range of movement dependent in part upon the position of said rotated member, said control part normally being outside the range of movement of said second connecting part, and an operative connection between said means for causing a relative shift in position between rotated member and shaft on the one hand and one of said control part and second connecting part on the other hand effective to bring said control part into the path of movement of said second connecting part when said relative shift is accomplished so as to cause said control part to be engaged by said second connecting part as the latter is rotated.

References Cited in the file of this patent

UNITED STATES PATENTS

| | | |
|---|---|---|
| 1,591,208 | Boerngen | July 6, 1926 |
| 1,777,263 | Hellstrom | Sept. 30, 1930 |
| 2,442,482 | Bancroft | June 1, 1948 |
| 2,748,612 | Dyer et al. | June 5, 1956 |

FOREIGN PATENTS

| | | |
|---|---|---|
| 630,701 | Great Britain | Oct. 19, 1949 |